Oct. 16, 1923.
C. W. JOHNSON
STEERING WHEEL
Filed Aug. 29, 1921
1,470,623
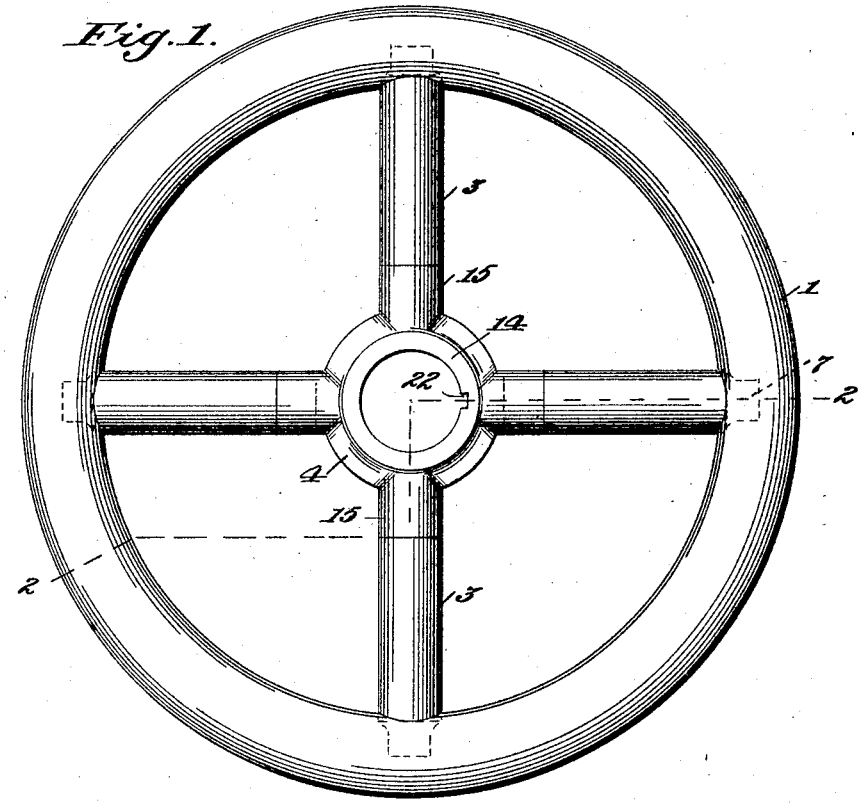
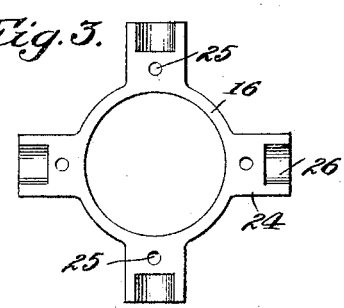

Patented Oct. 16, 1923.

1,470,623

UNITED STATES PATENT OFFICE.

CARL W. JOHNSON, OF ONAWAY, MICHIGAN, ASSIGNOR OF ONE-HALF TO KARL HODGE, OF POUGHKEEPSIE, NEW YORK.

STEERING WHEEL.

Application filed August 29, 1921. Serial No. 496,418.

*To all whom it may concern:*

Be it known that I, CARL W. JOHNSON, a citizen of the United States, residing at Onaway, in the county of Presque Isle and State of Michigan, have invented a certain new and useful Improvement in Steering Wheels, of which the following is a full, clear, and exact description.

This invention has reference to steering wheels for vehicles and more particularly to motor vehicles, such as automobiles, trucks and the like. Such steering wheels are ordinarily composed of an annular rim, a spider and a central hub which is provided with a keyway or spline for engagement with a key on the steering post of the vehicle.

The present invention comprises a simple, economical and strong construction for securing the arms constituting the spider to the rim and to the hub and in combination therewith a hub of novel construction which possesses strength, and the capacity for easy disengagement from the arms of the spider.

The annexed drawing and following description set forth in detail certain mechanism embodying the invention which latter, however, may be varied from the construction shown as to minor details without departing from the principles of the invention.

In the drawings,

Figure 1 represents a plan view of a steering wheel embodying the invention;

Figure 2 is a section on the line 2—2, Figure 1, and

Figure 3 is a detail view illustrating in plan the lower member of the two-part hub.

The steering wheel is composed of the usual annular rim 1, and a spider comprising radiating arms or spokes 3 which have connection at their opposite ends with the rim, and with a central hub 4, respectively. For the purpose of producing a steering wheel which may be manufactured economically in quantities and at the same time be simple in its construction and extremely strong so as to be capable of use on large vehicles, such as trucks, etc., the invention embodies the following organization: The rim 1, usually constructed of wood, is provided with a plurality of radial countersunk bores 5, which at their extreme outer portions are of one cylindrical size, and at their inner or entrance portions are of a larger size, as indicated by the reference character $5^a$, a tapered wall $5^b$ connecting the two bores.

Each arm 3 is at its outer end portion reduced to form a dowel 7, and the reduced portion or dowel at its base is formed with an inclined shoulder or fillet 9, so that the reduced end and enlarged portion of the arm merge into each other, instead of being provided with an abrupt shoulder at the point where they join. By this construction strength is imparted to the joint between the arm end and the rim for the reason that the largest portion of the arm is seated in a bore of the rim, while the reduced portion or dowel is seated in a counter bore and the resistance to fracture is much greater than if the arm were provided with an abrupt shoulder seated upon the surface of the rim surrounding the aperture which receives the dowel.

The inner end of each arm is reduced, forming a dowel 11 which enters a socket which is formed in part in each of two members of the hub 14, 16. The member 14 is formed as an annulus or ring having a plurality of radial projections 15, the undersides of which have semi-circular cavities 18 therein, and said ring is furthermore provided with a cylindrical portion 20 having the usual longitudinal keyway 22 to receive the key on the steering post.

The other, mating, part 16 of the hub is annular in form and of a size to fit snugly over the external periphery of the extension 20 of the part 14, and said member 16 has a plurality of radially extending portions 24, each provided with a semi-circular cavity 26 which, with the cavity 18, completes a circular socket to receive the dowel 11 of the spider arm. The part 16 of the hub has a plurality of holes 25, one in each extension 24, and screws 27 pass through these apertures and into threaded openings in the annulus 14 for securing the two parts of the hub 14, 16, together, as illustrated in Figure 2.

In order to assemble the parts of the wheel the arms 3 are first connected with the rim by the insertion of the reduced portions 7 into the sockets formed in the rim, the parts being held together by glue, cement, or any suitable means. The major member of the hub is then placed over the inner ends of the arms, the reduced portions 11 of the arms being seated in the semi-circular, recessed radial extensions 15, and the other member 16 of the hub is then slipped over the cylindrical extension 20 until its semi-circular recessed extensions 24 abut against the extensions 15, the sockets 26 embracing the dowels 11 of the arms 3 and cooperating with the sockets 18 to enclose the ends of the arms. The screws 27 are then inserted, which completes the assembling operation.

It will be seen that this wheel is extremely simple in construction, strong and easily assembled and disassembled, so that if any of its parts should be broken, new parts may be easily substituted, the removal of the screws 27 permitting the two parts of the hub to be separated so that a new arm or spoke may be placed in position in a very few minutes.

Having thus described the invention what is claimed is:

1. A steering wheel having, in combination, a rim provided with a plurality of radial recesses of two diameters connected by an inclined wall, an arm having its outer end reduced and constructed to enter the smaller recess while the major portion of the arm enters the larger recess, said arm having a reduced inner end, and a two-part hub provided with a radial projection having a portion of each part formed as a semi-circular socket, and means for securing the two parts of the hub together to clamp the inner end of the arm therebetween.

2. A steering wheel having, in combination, a rim with recesses in its inner surface, each formed of bores of two diameters connected by an inclined wall, spider arms each having its outer end formed with a reduced portion and a fillet at the base thereof, the arm adapted to enter the recess and fit the two bores thereof, said arm having a reduced inner end, and a two part hub, the members of which telescope with reference to each other, and each of said members provided with a radial projection which is formed with a semi-circular recess to embrace the reduced end of the arm, and means for fastening the two parts of the hub together.

In testimony whereof I have hereunto set my hand this 19th day of August A. D. 1921.

CARL W. JOHNSON.

Witnesses:
LEWIS E. WAGGONER,
ANNA A. CAMPBELL.